Oct. 30, 1945.  O. WEIL  2,388,027
ALTIMETER
Filed Dec. 21, 1943  2 Sheets-Sheet 1
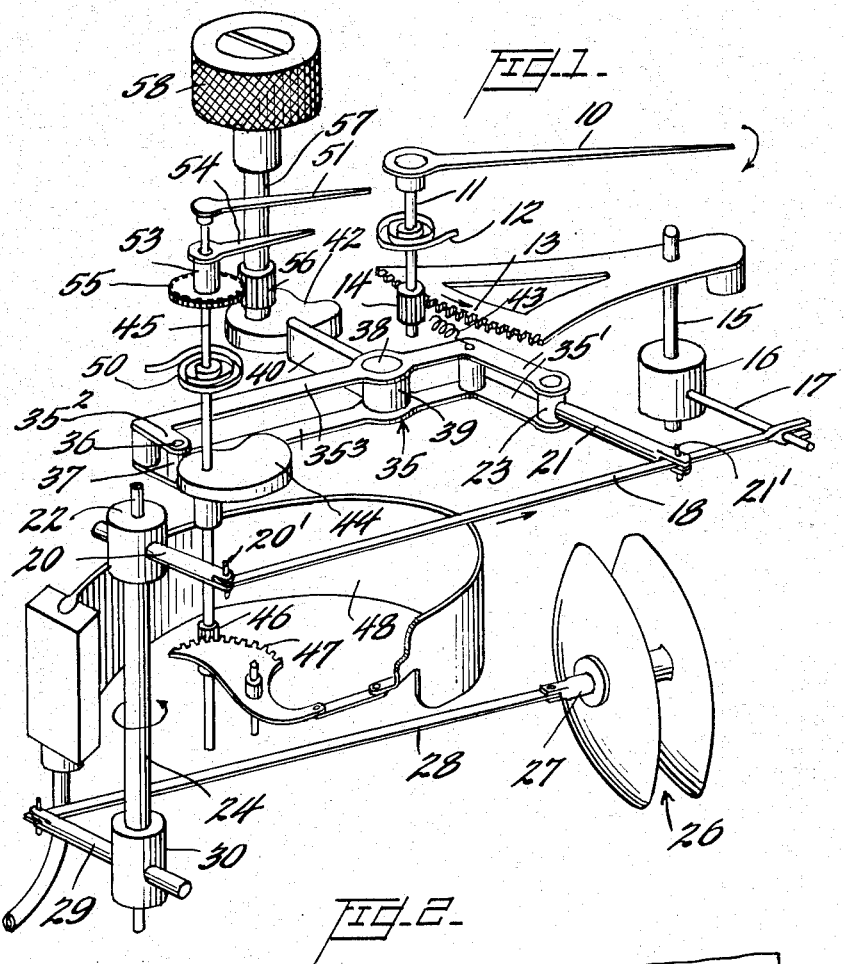
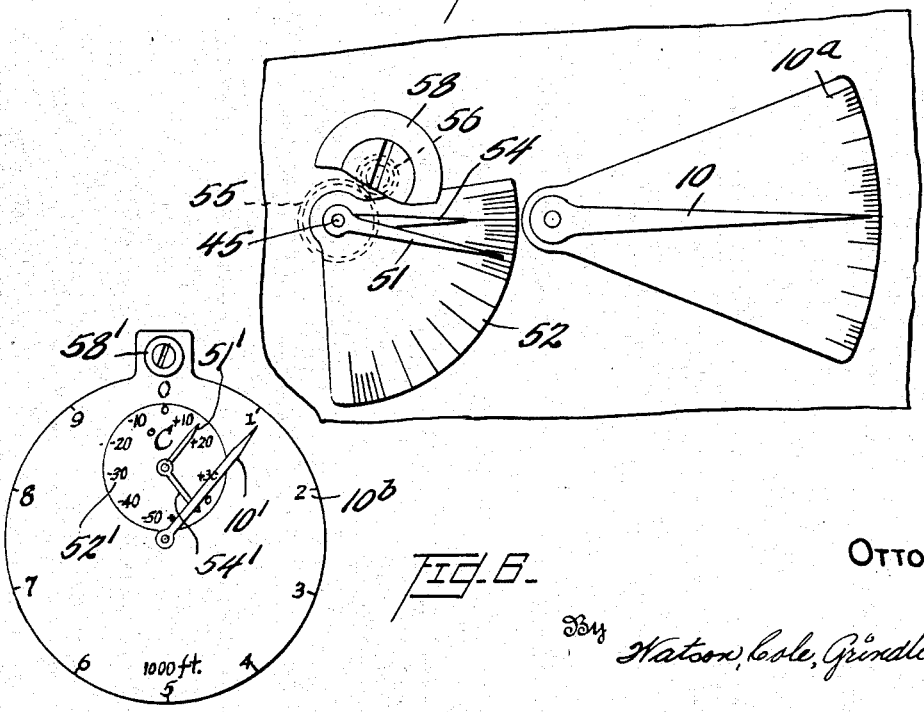
Inventor
OTTO WEIL
By Watson, Cole, Grindle & Watson
Attorney

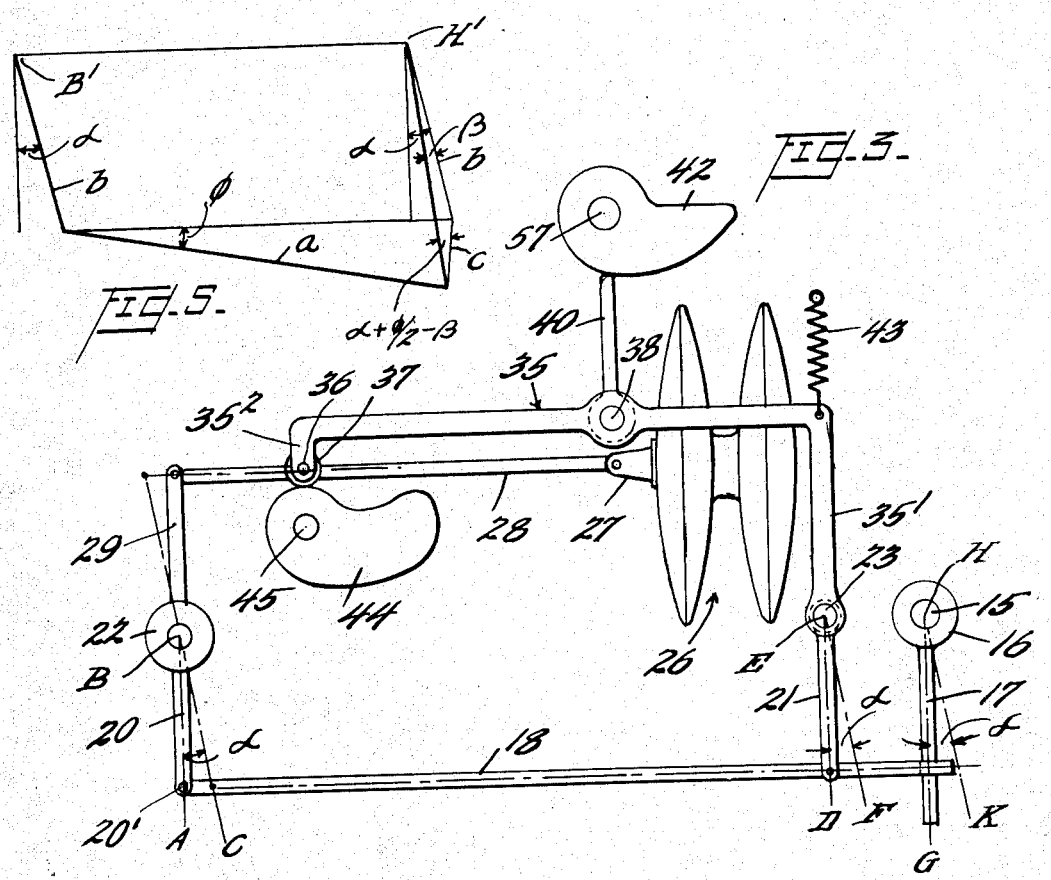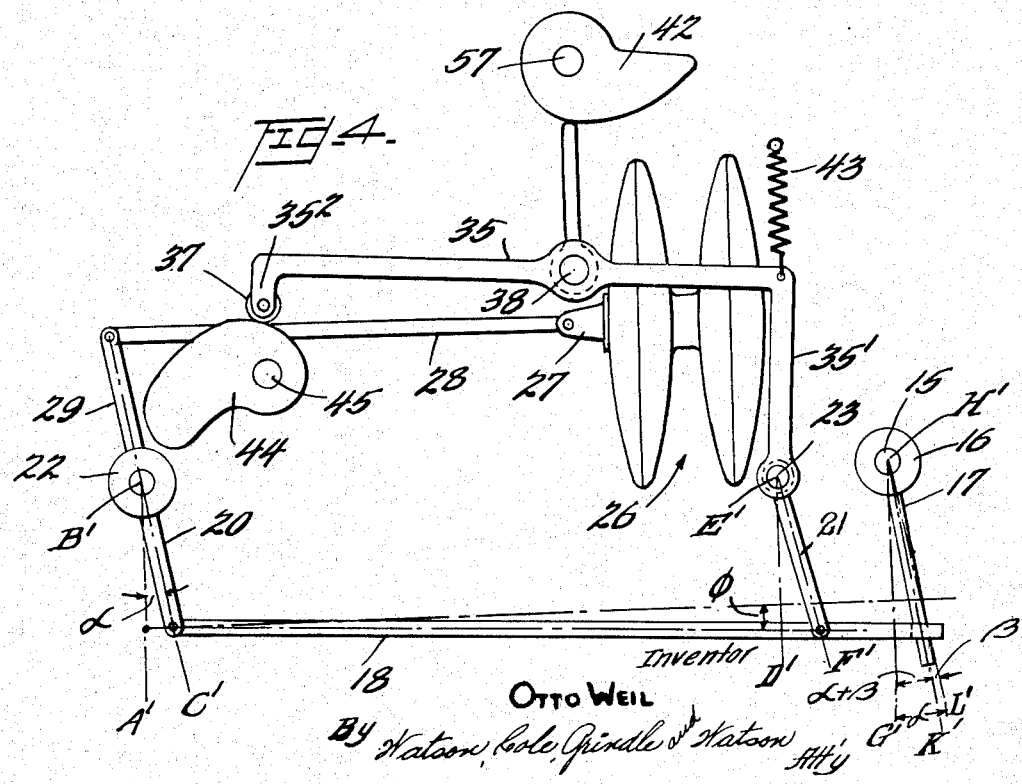

Patented Oct. 30, 1945

2,388,027

UNITED STATES PATENT OFFICE 2,388,027

ALTIMETER

Otto Weil, New York, N. Y.

Application December 21, 1943, Serial No. 515,175

3 Claims. (Cl. 73—387)

This invention relates to instruments for the detection of variations in altitude, such instruments being commonly designated altimeters, and being widely used upon aircraft to inform the operators thereof of the elevation of such aircraft above sea level.

Many types of altimeters have heretofore been designed or suggested, and numerous kinds have heretofore and are now in actual service. It is not a difficult matter to provide an instrument which will accurately indicate variations in altitude resulting directly and solely from variations in air pressure. Such an instrument includes as its principal element a pressure responsive means which records the actual pressure existing at all elevations. It is known, however, that in the determination by instrument of the elevation of a point above sea level the actual existing pressure at that point must not only be known, but that the temperature must also be taken into consideration. A standard and well-known formula for the determination of the true altitude at a given point above sea level is as follows:

$$H_t = \frac{2,000(T_0 + T_a)H_i}{576,000 - 1.9812 H_i}$$

in which formula $H_t$ is the true altitude, $T_0$ is the temperature existing at sea level, $T_a$ is the temperature existing at the altitude of the instrument or pointer, and $H_i$ the elevation indicated by the pressure responsive means. This formula takes into consideration the mean temperature of the air. Obviously, if the mean air temperature were to remain constant the true altitude of the instrument at any time would vary solely with the indicated height as determined by the pressure responsive means. As the mean air temperature does vary, however, as the height varies, any altimeter which neglects to make allowance for such temperature variations cannot accurately indicate true altitudes. Realizing this, aviators have heretofore found it necessary to use, in association with altimeters the readings of which reflect solely variations of pressure, special charts showing the effect on the readings obtained of temperature variations, the task of pilot and navigator being considerably complicated by reason of the necessity of the use of the chart to supplement the instrument.

The purpose of the present invention is to provide an instrument having means incorporated therein, in addition to the customary pressure responsive elevation indicating mechanism, to automatically record temperature changes and to modify the action of the pressure responsive indicating mechanism from time to time as variations of temperature occur, an altitude indicator provided for the inspection of a pilot or navigator indicating the true altitude, such indication being based upon temperature as well as pressure, the need for temperature charts being thus obviated and the work of the navigator and pilot being greatly simplified. While it has heretofore been proposed that altimeters having pressure responsive means be so modified such instruments have not, for one reason or another, been adopted and used and it is a further purpose of the invention to provide an instrument which is of such simple nature, and which may be so ruggedly constructed that its adoption and use will be assured. In the following specification, and in the accompanying drawings, a preferred type of instrument is rather diagrammatically shown. It will be appreciated by those experienced in the art, however, that the form of the invention which is disclosed is set forth by way of example only and that the design and arrangement of its component elements may be considerably modified without departure therefrom.

In the drawings:

Figure 1 is a perspective view showing those portions of the improved altimeter which are vital and essential to its operation, the casing, bearing supports for the several operating parts, and other conventional elements being omitted for the sake of clarity;

Figure 2 is a plan view of portion of the altimeter casing showing the indicating dials and pointers;

Figure 3 is a plan view of portion of the mechanism shown in Figure 1, the purpose of this view being to illustrate the movements of certain parts of the mechanism as they would occur in the event that no variations in temperature were met with;

Figure 4 is a similar view, the influence upon the indicating mechanism of the temperature responsive means being indicated;

Figure 5 is a diagram indicating the movements of the controlling levers of Figure 4, and forming a basis for certain mathematical derivations; and Figure 6 is a plan view of a dial arrangement which may be employed with the altimeter instead of the one shown in Figure 2.

The instrument will, of course, include one or more pointers to indicate the true altitude of the instrument and a pointer of this type is indicated by the reference numeral 10, the dial over which the pointer plays being diagrammatically indicated at 10a in Figure 2. The hub of the pointer or indicating hand 10 is mounted upon a short shaft 11 supported by bearings, not illustrated, for rotation about a fixed axis. A spring, such as the spiral spring 12, normally tends to turn the shaft 11 in one direction and to move the pointer 10 toward a predetermined zero position. Rotation of shaft 11 and movement of the pointer 10 in the opposite direction is brought about by means of the movement of the circular rack 13 in a plane transverse to the shaft 11, the teeth of circular rack 13 meshing with those of a pinion 14 fixed upon shaft 11.

Circular rack 13 is in turn fixed upon a shaft 15 disposed parallel to shaft 11, and suitably supported for rotation about its own axis by bearings, not illustrated. Upon shaft 15 is mounted a hub 16 carrying a laterally extending arm 17. This arm may be said to comprise a driven member adapted to receive a driving force imparted thereto by a thrust rod 18 the end of which is bifurcated as clearly shown in Figure 1, the arm 17 lying at all times between the arm of the bifurcated portion and the thrust rod 18 being adapted to apply a driving or operating force upon the rod 17 at various points along its length, rod 18 being mounted in such manner that it may be bodily shifted in a plane normal to the axis of shaft 15 so that its bifurcated end may be moved along arm 17.

The thrust rod 18 is pivotally connected at 20' and 21' to the outer or free ends of the parallel arms 20 and 21, these arms being generally parallel to the arm 17, being equal in length, and the ends thereof remote from thrust rod 18 being fixed in hubs 22 and 23 respectively, these hubs being rotatable about parallel axes which are parallel to the axes of shafts 15 and 11. Hub 22 is mounted upon a shaft 24 which is supported by bearings, not illustrated, in fixed position, whereas, hub 23 is so mounted on the lever member 35 that it may be shifted in a plane which includes the arms 20, 21, and 17, and along a line in this plane which is substantially parallel to the arm 17, shifting of hub 23 therefore causing travel of the bifurcated end of the thrust rod 18 longitudinally along the arm 17 and thus varying the distance of the point of application of force to the arm 17 with respect to the axis of the shaft 15, as will be presently described in detail.

Any suitable pressure responsive means may be employed and in the form of the invention illustrated by way of example a pressure responsive device of the bellows type is indicated at 26, the movable element 27 of this device being connected by means of a link 28 to the outer or free end of an arm 29 fixed on the hub 30, hub 30 being in turn fixed upon shaft 24. With this arrangement it is clear that the pointer 10 will indicate movements of the member 27 of the pressure responsive means in the instrument, motion of this member being communicated through the intermediate connecting parts just described whenever the member 27 moves in either direction. Assuming that member 27 moves to the left (Figure 1) through expansion of the bellows 26, the action of link 28 and arm 29 will be such as to cause counterclockwise rotation of the shaft 24 and movement of the thrust rod 18 toward the right, the force applied to arm 17 effecting movement of the circular rack 13 in a counterclockwise direction, resulting in movement of the pointer 10 in a clockwise direction and winding up of the torsion spring 12. Movement of the member 27 toward the right upon contraction of bellows 26, will result in movement of indicator pointer 10 in the opposite direction, the spring 12 becoming active to effect this movement as the bifurcated end of the thrust rod 18 tends to recede from the arm 17, the spring being effective to cause the arm 17 to follow the end of the thrust rod and to maintain contact between the arm 17 and the end of the thrust rod at all times. During this operation the hub 23 simply revolves idly with respect to its supporting arms 35 and the arm 21 performs guiding and supporting functions only, imposing no driving or retarding force upon the thrust rod 18.

The temperature responsive mechanism, the function of which is to modify the action of the mechanism so far described so that the pointer 10 will be caused to indicate the true altitude, serves to shift the hub 23, arm 21, and thrust rod 18 automatically in response to variations in temperature so that the point of contact between the bifurcated end of the thrust rod 18 and the arm 17 will be varied. Obviously the angular movement of pointer 10 will be decreased, for a given movement of member 27, if the bifurcated end of thrust rod 18 is shifted outwardly along arm 17, and will be increased if the bifurcated arm of thrust rod 18 is shifted inwardly along arm 17. The temperature responsive means, therefore, is so connected to the hub 23 as to effect this shifting movement in an entirely automatic manner so that the effect of the mean temperature of the atmosphere in which the instrument finds itself will be fed into the machine automatically. This temperature responsive mechanism includes a lever member 35, preferably comprising parallel arms and spacing posts, and mounted for movement in a plane normal to shafts 11, 15, and 24 by suitable supporting means (not illustrated).

Lever member 35 is provided with a relatively long arm 35' at one end which pivotally supports the hub 23 and the relatively short arm $35^2$ at its opposite end which carries a short spindle 36 upon which a roller 37 is rotatably mounted. The arms $35^1$ and $35^2$ are disposed at right angles to the main portion of the lever 35, which comprises spaced parallel members $35^3$ each of which is provided, intermediate its ends, with an enlarged and centrally apertured portion to receive the trunnions 38 of a hub 39 having an arm 40 projecting horizontally and in a direction substantially at right angles to the lever. The end of arm 40 rests against a cam member 42 and this arm is so supported by guide means which is not shown that it may be moved in the direction of its length when cam 42 is revolved, thus shifting hub 39, effecting movement of the lever 35 and movement of the hub 23 pivotally attached to the end of arm 35' of the lever. Roller 37 at all times rests against the face of a cam 44, so that cam 44 comprises a base preventing movement of the end of the lever which carries roller 37 when cam 42 is active. Likewise cam 42 comprises a base which prevents movement of the arm 40 and of the hub 39 when cam 44 is revolved about a vertical axis. It thus appears that lever 35 has a shiftable fulcrum and means for effecting shifting movement of the fulcrum in the plane of the lever, likewise an actuating cam 44 which, when operated, will effect rocking movement of the lever about its fulcrum. The cam follower portions of the lever 35 are urged in the direction of their respective cams as by means of a spring 43.

The cam 44 is mounted upon the vertically supported shaft 45 the lower end of which is operatively connected by means of a pinion 46 and circular rack 47 to the end of a temperature responsive member 48 of any conventional type, sufficiently sensitive to indicate accurately small variations in temperature and sufficiently strong in action to apply a substantial torque to the shaft 45, so that cam 44 may rock lever 35, effecting shifting of the hub 23 and hence effecting movement of the bifurcated end of the thrust rod 18 along the arm 17. It will be understood that the end of thrust rod 18 remote from the bifurcated end, is pivoted to the arm 20 and that the movement of thrust rod 18 is an angular movement about this point of pivotal connection.

The spiral torsion spring 50 has one end secured to shaft 45 and normally tends to rotate this shaft in one direction, this spring opposing the action of member 48 and restoring the shaft when member 48 recedes. Upon the upper end of shaft 45 is a temperature indicating pointer 51 which is adapted to play over a scale 52, shown in Figure 2. Encircling the shaft 45 is a sleeve 53 carrying a second pointer 54 and a small gear 55 the teeth of which mesh at all times with those of a pinion 56 fixed on vertical shaft 57 to the lower end of which the cam 42 is secured. At its upper end the shaft 57 is provided with a knurled handle 58 by means of which the operator can rotate the cam 42 and thus at the same time move the pointer 54 over the scale 52.

It has been previously explained that the instrument forming the subject of the present invention is designed to indicate true altitude, by means of the pointer 10. This involves applying what amounts to two corrections, one for the temperature at the flight altitude, and the other in accordance with the temperature at sea level. The first correction is automatically registered in the instrument itself, while in the illustrated embodiment, the correction for temperature at sea level is set by the pilot who receives the weather reports before and during flight. Actually the instrument, by means of the floating lever 35 and its connections, resolves these two temperature corrections and produces a component motion which corrects the reading of the pointer 10 according to the mean temperature between the flight level and sea level.

In setting up the instrument, it is adjusted so as to indicate the true altitude at say 15° C. In this condition, the arrangement is such that the pivot points or axes of the hubs 22, 23, and 16 are in alignment. Then in use, the pointer 54 is set by means of the knob 58 to a point on the dial 52 indicating the temperature at sea level. During this setting, the cam 42 will act upon the follower projection 40 carried by the compound floating lever 35 and will give it a movement in one direction or the other to affect the angularity of the thrust rod 18. Of course, at the same time the temperature indicating device 48 will rotate the cam 44 which will apply to the floating lever a movement which is also transmitted to the thrust rod. These movements are compounded by the lever 35 and the resultant indicative of the mean temperature is applied to the thrust rod.

If the instrument changes altitude, but the mean temperature does not change, the reading of the pointer 10 will then reflect only the movements of the element 27 of the pressure responsive device. If, as practically always happens, the temperature varies as well as the altitude, the cam 44 automatically revolves about the axis of shaft 45, thrusting away from shaft 45 the adjacent end of the lever 35 and thus bodily shifting hub 23 in the opposite direction, the fulcrum of the lever, which passes through hub 39, remaining fixed. The outward travel of the bifurcated end of the thrust rod 18 along the arm 17 increases the distance between the point of application of the force to this arm and the axis of the shaft 15 and thus decreases the angular rotation of the shaft 15 for any given linear movement of the element 27 of the pressure responsive device 26, thus lowering the angular movement of the pointer 10 for any given change in pressure. Naturally rotation of the shaft 45 in the opposite direction will result in movement of the bifurcated end of the thrust rod 18 toward the axis of shaft 15 and increase of the angular movement of the pointer 10 for a given linear movement of member 27 and the pressure responsive means 26.

In Figures 3 and 4 of the drawings the thrust rod 18 is shown in different positions. In Figure 3 this rod is shown, in full lines, in one position, and a position which it will occupy as it is longitudinally shifted to indicate changes in pressure without changes in temperature, is indicated by the dot-dash lines, the assumption being that the pressure has changed without change in temperature. In Figure 4 the same elements are shown and it is assumed that the pressure responsive means has imparted to the thrust rod 18 the same longitudinal movement as it has in Figure 3, the arm 20 having in each instance been advanced through the angle $\alpha$, indicated by the letters A, B, and C in Figure 3 and A', B', C' in Figure 4.

In Figure 3 the arm 21, which is the same length as the arm 20, is also shown to have been advanced through the angle $\alpha$, which is indicated by the letters D, E, F, and likewise the arm 17 has been advanced to the angle $\alpha$ as indicated at G, H, K. The position of the thrust rod 18 at any time, therefore, is parallel to the position which it occupies at any subsequent time due to the pressure factor alone. Where a variation in temperature enters in, however, and the lever 35 is rocked by the cam 44, as shown in Figure 4, the thrust rod 18 will be rocked outwardly because of movement of the hub 23 through an angle such as indicated at $\phi$ as shown, the bifurcated end of the thrust rod being shifted outwardly along the arm 17. If we now assume that the arm 20 is rocked by the pressure responsive means through the angle $\alpha$, indicated at A', B', C' in Figure 4, the arm 17 will be rocked through a somewhat smaller angle due to the outward shifting of the thrust rod 18, this smaller angle being indicated at G', H', K', the angle $\alpha$ through which arm 20 has been moved being indicated at G', H', L' and exceeding the actual angle through which arm 17 has been rocked by the small angle $\beta$, indicated at K', H', L'. The angle through which the arm 17 is rocked, therefore, will differ from the angle $\alpha$ through which the arm 20 is rocked and may be said to be equal to the angle $\alpha$ plus the angle $\beta$, the angle $\beta$ being either positive or negative depending upon the direction of movement of the thrust rod 18 along the arm 17.

The angle $\beta$, which is the angle to be added to or subtracted from the angle $\alpha$, and which is automatically determined by the mechanism just described, can be determined actually by the following formula:

$$\beta = \operatorname{arc\,cot}\left[\cot\left(\alpha + \frac{\phi}{2}\right) + \frac{b}{2e \sin\frac{\phi}{2} \sin\left(\alpha + \frac{\phi}{2}\right)}\right]$$

in which formula $\phi$ represents the angle through which the thrust rod 18 is shifted by the temperature responsive means, the angle $\alpha$ represents the angular movement of the arm 20 which results from the operation of the pressure responsive means, the letter $e$ represents the total length of the thrust rod 18, the letter $b$ represents the length of the arm 20, which is always equal to the length of the arm 21, and is always one-fifth of the length of the thrust rod 18. In the design of the temperature responsive means the lever 35 is so proportioned that its fulcrum is three-fifths of its length distant from that end thereof which carries the roller 37 and two-fifths of its length distant from that end which is connected to the hub 23. That portion of the thrust rod 18 which lies between the end of arm 21 and arm 17 is one-eighth of the total length of this rod.

The derivation of the formula set forth above will be understood from the following when read in connection with Figure 5 of the drawings.

$$c = 2a \cdot \sin\frac{\phi}{2} \quad (1)$$

$$\frac{c}{\sin\beta} = \frac{b}{\sin\left(\alpha + \frac{\phi}{2} - \beta\right)} \quad (2)$$

Substituting:

$$\frac{2a \cdot \sin\frac{\phi}{2}}{\sin\beta} = \frac{b}{\sin\left(\alpha + \frac{\phi}{2} - \beta\right)} \quad (3)$$

$$\frac{2a}{b} \cdot \sin\frac{\phi}{2} = \frac{\sin\beta}{\sin\left(\alpha + \frac{\phi}{2} - \beta\right)} \quad (4)$$

$$\sin\left(\alpha + \frac{\phi}{2} - \beta\right) = \sin\left(\alpha + \frac{\phi}{2}\right) \cdot \cos\beta - \cos\left(\alpha + \frac{\phi}{2}\right) \cdot \sin\beta$$

Hence:

$$\frac{2a}{b} \cdot \sin\frac{\phi}{2}\left[\sin\left(\alpha + \frac{\phi}{2}\right) \cdot \cos\beta - \cos\left(\alpha + \frac{\phi}{2}\right) \cdot \sin\beta\right] = \sin\beta \quad (5)$$

$$\frac{2a}{b} \cdot \sin\frac{\phi}{2} \sin\left(\alpha + \frac{\phi}{2}\right) \cdot \cot\beta - \frac{2a}{b} \cdot \sin\frac{\phi}{2} \cdot \cos\left(\alpha + \frac{\phi}{2}\right) = 1 \quad (6)$$

$$\cot\beta = \frac{1 + \frac{2a}{b} \cdot \sin\frac{\phi}{2} \cdot \cos\left(\alpha + \frac{\phi}{2}\right)}{\frac{2a}{b} \cdot \sin\frac{\phi}{2} \cdot \sin\left(\alpha + \frac{\phi}{2}\right)} \quad (7)$$

$$\cot\beta = \frac{b}{2a \cdot \sin\frac{\phi}{2} \cdot \sin\left(\alpha + \frac{\phi}{2}\right)} + \cot\left(\alpha + \frac{\phi}{2}\right) \quad (8)$$

$$\beta = \operatorname{arc\,cot}\left[\cot\left(\alpha + \frac{\phi}{2}\right) + \frac{b}{2a \cdot \sin\frac{\phi}{2} \cdot \sin\left(\alpha + \frac{\phi}{2}\right)}\right] \quad (9)$$

The two cams 42 and 44 are somewhat similar in shape and each has a varying radius, these radii being given at any point by the following formulas.

For cam 44, $$R = (a + b) - b\frac{\theta}{2\pi}$$

where

R = radius of cam.
$a + b$ = maximum radius.
$b = 3/2\, c \tan \theta$.
$a$ = constant.
$\theta$ = angle in radians.
$c$ = distance between 20' and 21' along rod 18 (⅞ of total length of rod).
$\phi$ = angle through which thrust rod 18 is shifted.

The radius of the cam decreases at a uniform rate from a maximum $(a+b)$ to a minimum $(a)$ according to the above equation.

For cam 42, $$R' = (a' + b') - b'\frac{\theta}{2\pi}$$

where $R'$ = radius of cam.
$b' = \tfrac{3}{5}\, c \tan \phi$.
$a'$ = constant.

In Figure 6 there is illustrated a modified dial in which the indicia are arranged in circles and the adjusting knob 58' is disposed outside of the larger dial area. The pointer 10' sweeps around the outer dial 10b which is graduated in thousands of feet while the hands 51' and 54' corresponding to hands 51 and 54 of Figure 2, sweep around a smaller inner dial 52' graduated in degrees of temperature. The mechanical connections in this embodiment are the same or the equivalent of those previously described in connection with the first embodiment.

Various other changes and modifications may be made in the embodiments illustrated and described herein without departing from the scope of the invention as defined by the following claims.

Having thus described the invention, what is claimed as new and desired to be secured by Letters Patent is:

1. In an instrument of the class described, in combination, means responsive to changes in altitude for indicating such changes, said means including an elongated thrust rod pivotally connected to the ends of parallel arms mounted on hubs rotatable, respectively, about parallel axes, and an indicator arranged to be actuated when the thrust rod is reciprocated, and temperature controlled means for bodily shifting one of said hubs to angularly adjust the position of the rod about the other hub, for the purpose set forth.

2. In an instrument of the class described, in combination, an altitude indicating member, means responsive to changes in altitude of the instrument for actuating said member to cause the same to indicate such changes, said means including an arm supported for movement about a fixed axis, a thrust rod for applying an operating force to said arm, said thrust rod having one end positioned to engage said arm at various distances from said axis, a carrier for the other end of the thrust rod, by means of which the rod may be moved longitudinally to act upon and move said arm, and mechanism movable automatically in respect to variations in temperature at the instrument, means for applying an adjustment to said mechanism in accordance with the temperature at sea level, and means operatively connecting said mechanism with said thrust rod to vary the point of contact therewith along said arm as the mean of said temperatures varies.

3. In an instrument of the class described, in combination, an altitude indicating member, means responsive to changes in altitude of the instrument for actuating said member to cause the same to indicate such changes, said means including an arm supported for movement about a fixed axis, a thrust rod for applying an operating force to said arm, said thrust rod having one end positioned to engage said arm at various distances from said axis, a carrier for the other end of the thrust rod, by means of which the rod may be moved longitudinally to act upon and move said arm, and correction mechanism comprising a floating lever, means operatively connecting a point on said lever with said thrust rod, means movable in response to variations in temperature at said instrument and disposed in contact with said floating lever at another point, and means adapted to be moved to accord with variations in temperature at sea level, and disposed in contact with said floating lever at still another point, whereby a movement which is the resultant of those given the lever by the means movable in response to variations in temperature and means adapted to be moved to accord with variations in temperature at sea level is given to the thrust rod to vary the point of contact therewith along the said arm.

OTTO WEIL.